United States Patent [19]

Melquist et al.

[11] 4,210,559
[45] Jul. 1, 1980

[54] CATALYST FOR THE PREPARATION OF POLYALPHA-OLEFINS HAVING BROAD MOLECULAR WEIGHT DISTRIBUTIONS

[75] Inventors: John L. Melquist, Naperville, Ill.; Nicholas K. Kildahl, Shrewsbury, Mass.; Peter Fotis, Highland, Ind.

[73] Assignee: Standard Oil Company of Indiana, Chicago, Ill.

[21] Appl. No.: 955,775

[22] Filed: Oct. 30, 1978

[51] Int. Cl.² ............................................. C08F 4/64
[52] U.S. Cl. ........................... 252/431 R; 252/429 B; 252/429 C; 526/114
[58] Field of Search ............ 252/429 C, 429 B, 431 R

[56] References Cited

U.S. PATENT DOCUMENTS

| 2,930,785 | 3/1960 | Edmonds | 252/429 B X |
| 3,069,364 | 12/1962 | D'Alelio | 252/429 C |
| 3,288,769 | 11/1966 | Cooper et al. | 252/429 C X |
| 3,404,141 | 10/1968 | Owen | 252/429 R X |
| 3,678,025 | 7/1972 | Birrell | 252/429 C X |
| 3,899,477 | 8/1975 | Altamore et al. | 252/429 C X |
| 4,109,071 | 8/1978 | Berger et al. | 252/429 C X |
| 4,130,699 | 12/1978 | Hoff et al. | 252/429 B X |
| 4,154,701 | 5/1979 | Melquist | 252/429 B |

FOREIGN PATENT DOCUMENTS 1176868 4/1965 Fed. Rep. of Germany .

*Primary Examiner*—Patrick Garvin
*Attorney, Agent, or Firm*—Stephen L. Hensley; William T. McClain; William H. Magidson

[57] ABSTRACT

Catalyst for the polymerization of alpha-olefins to polymers having broad molecular weight distributions consisting essentially of an organometallic promoter and the solid reaction product of an alkylaluminum component, at least one titanium(IV) compound, and at least one zirconium(IV) compound.

28 Claims, No Drawings

CATALYST FOR THE PREPARATION OF POLYALPHA-OLEFINS HAVING BROAD MOLECULAR WEIGHT DISTRIBUTIONS

BACKGROUND OF THE INVENTION

This invention relates to alpha-olefin polymerization catalysts, and more particularly, to catalysts useful in the preparation of polyalpha-olefins, and especially polyethylene, of broad molecular weight distributions consisting essentially of (A) an organometallic promoter; and (B) the reaction product of an alkylaluminum halide with at least one titanium(IV) compound and at least one zirconium(IV) compound.

In the polymerization of alpha-olefins it is desirable to employ catalysts which allow for the production of polymeric products having broad molecular weight distributions because such polymers are easily processed.

One approach in attempting to provide such catalysts has been to employ mixtures of compounds of different transition metals. For example, U.S. Pat. No. 3,678,025, to Birrell, discloses mixed catalyst systems comprising (1) the reaction product of a Group IA, IIA, or IIIA metal alkyl, alkylhalide, or alkylhydride reducing agent and a halide, oxyhalide, alcoholate, alkoxide, or ester of a Group IVB, VB, or VIB metal other than zirconium; and (2) the reaction product of a Group IA, IIA, or IIIA metal alkyl, alkylhalide, or alkylhydride reducing agent and a zirconium halide or oxyhalide. The disclosed catalysts are useful in the preparation of polyalpha-olefins having relatively broad molecular weight distributions, however, catalyst activities are relatively low. Furthermore, the disclosed catalysts are disadvantageous because two separate preparations are required.

U.S. Pat. No. 3,899,477, to Altamore et al. also discloses catalysts for the polymerization of alpha-olefins to polymers of broad molecular weight distributions. The disclosed catalysts comprise (1) a mixture of an alkylaluminum sesquialkoxide with a trialkylaluminum; and (2) a component prepared by reacting a titanium halide, a vanadium halide, and an alkylaluminum compound in amounts such that the ratio of aluminum to the sum of titanium and vanadium ranges from 0.1 to 0.5. While such catalysts exhibit relatively high activities and allow for preparation of polyalpha-olefins having relatively broad molecular weight distributions, the catalysts are disadvantageous because a mixture of an alkylaluminum sesquialkoxide and a trialkylaluminum compound must be used as the promoter to achieve broad polymer molecular weight distributions. The preparation and use of this mixed promoter can add cost and inconvenience to polymerization processes.

From the foregoing, it is apparent that an improved catalyst for the polymerization of alpha-olefins to polymers of broad molecular weight distributions would be desirable. It is an object of this invention to provide such an improved catalyst and a method for the preparation thereof. Another object of the invention is to provide for the polymerization of alpha-olefins in the presence of such catalysts. Other objects of the invention will be apparent to persons of skill in the art from the following description and the appended claims.

We have found that the objects of this invention can be achieved by reacting an alkylaluminum component, at least one titanium(IV) halide, alkoxide, or alkoxyhalide, and at least one zirconium(IV) halide, alkoxide, or alkoxyhalide to form a solid catalyst component which, when combined with an organometallic promoter, catalyzes the polymerization of alpha-olefins to polymers of broad molecular weight distributions in sufficiently high yields, relative to the amount of catalyst employed, that separation of catalyst residues from the polymeric products is unnecessary. Although the mechanism by which the solid component is formed is not known, it is believed that the preparative reaction involves a reduction of the titanium compound and the formation of solid, lower valent titanium halides which bond to or are coated onto solid zirconium compounds. Accordingly it is believed that the composition of the invented catalyst components differs substantially from the mixture of separately prepared titanium and zirconium components disclosed in the Birrell patent. Additionally, unlike the catalysts of that patent, the invented catalyst components require only one preparation and are generally superior in activity. The invented catalyst components are clearly distinguishable from those of the Altamore et al. patent because the former are prepared from titanium and zirconium compounds, with vanadium compounds such as are employed according to Altamore et al. being excluded. Additionally, the invented catalyst components allow for the attainment of broad polymer molecular weight distributions without the need for a mixed promoter. The invented catalysts also exhibit a relatively high sensitivity to hydrogen which is commonly employed in alpha-olefin polymerization to regulate polymer molecular weights. Accordingly, the invented catalysts can be employed to prepare polymers having a wide range of flow properties. Another beneficial feature of the invented catalyst components is that variations in the breadth of polyalpha-olefin molecular weight distributions can be achieved by simply varying the relative amounts of titanium and zirconium compounds employed in preparation of the catalyst components.

Other catalysts based on combinations of titanium and zirconium have been disclosed and may be of interest to the present invention. U.S. Pat. No. 2,930,785, to Edmonds, Jr., discloses catalysts comprising (1) a compound of a Group IVB metal, including titanium(IV) and zirconium(IV) alkoxides, aryloxides, alkenyloxides, or acyloxides; (2) a halide of silicon, germanium, tin, lead, phosphorus, arsenic, antimony, or bismuth, and (3) an elemental metal having an oxidation potential higher than that of the Group IVB metal contained in (1). It also is disclosed that mixtures of compounds of the Group IVB metals can be employed as (1), however, there is no suggestion to prepare a catalyst component by reacting such a mixture with an alkylaluminum compound, nor does Edmonds, Jr. suggest the use of an organometallic promoter. The invented catalysts are distinguishable from those of Edmonds, Jr. for the additional reason that the former do not include the metal halide and elemental metal components disclosed in the patent. Additionally, Edmonds, Jr. is silent with respect to polymer molecular weight distributions and catalyst activities are insufficient to eliminate the need for removal of catalyst residues from polymeric products produced in the presence of the catalysts. U.S. Pat. No. 3,069,364, to D'Alelio, discloses alpha-olefin polymerization catalysts prepared by grinding zirconium metal with titanium dichloride for at least about 48 hours at ambient temperature. This patent also is silent with respect to polymer molecular weight distributions. West German Pat. No. 1,176,868, to Farbenfabriken Bayer A.G., discloses catalysts for the polymerization of ethylene to polymers of controlled molecular weights comprising zirconium dihalides or mixtures thereof with other metal halides, including those of divalent titanium. It also is disclosed that polymer molecular weights vary depending on the choice of metal halide which is mixed with the zirconium dihalide.

DESCRIPTION OF THE INVENTION

Briefly, the catalysts of this invention consist essentially of (A) an organometallic promoter, and (B) the solid reaction product of an alkylaluminum component with at least one titanium(IV) halide, alkoxide, or alkoxyhalide and at least one zirconium(IV) halide, alkoxide, or alkoxyhalide.

Titanium compounds useful in preparation of the solid component of the catalysts of this invention include compounds represented by the formula $Ti(OR)_mX_{4-m}$, wherein R is a hydrocarbyl radical of 1 to about 20 carbon atoms, and preferably an alkyl radical having 1 to about 6 carbon atoms; X is halogen, preferably chlorine or bromine, and most preferably chlorine, and m runs from 0 to 4. Examples of useful titanium compounds include titanium tetrahalides such as $TiCl_4$, $TiBr_4$; titanium alkoxytrihalides such as $Ti(OCH_3)Br_3$, $Ti(OC_2H_5)Cl_3$, $Ti(OC_4H_9)Cl_3$, and $Ti(OC_6H_{13})Br_3$; titanium dialkoxydihalides such as $Ti(OCH_3)_2Br_2$, $Ti(OC_2H_5)_2Cl_2$, $Ti(OC_4H_9)_2Cl_2$, and $Ti(OC_6H_{13})_2Br_2$; titanium trialkoxyhalides such as $Ti(OCH_3)_3Br$, $Ti(OC_2H_5)_3Cl$, $Ti(OC_4H_9)_3Cl$, and $Ti(OC_6H_{13})_3Br$; and titanium tetraalkoxides such as $Ti(OCH_3)_4$, $Ti(OC_2H_5)_4$, $Ti(OC_4H_9)_4$, $Ti(OC_5H_{11})_4$, and $Ti(OC_6H_{13})_4$. Mixtures also can be employed. Preferred titanium compounds are the tetraalkoxides having 1 to about 6 carbon atoms per alkoxy radical, and particularly, titanium tetrabutoxide.

Useful zirconium compounds include those having the formula $Zr(OR)_mX_{4-m}$, wherein R, X, and m are as described above. Exemplary zirconium compounds include zirconium tetrahalides such as $ZrCl_4$ and $ZrBr_4$; zirconium alkoxytrihalides such as $Zr(OCH_3)Br_3$, $Zr(OC_2H_5)Cl_3$, $Zr(OC_4H_9)Cl_3$, and $Zr(OC_6H_{13})Br_3$; zirconium dialkoxydihalides such as $Zr(OCH_3)_2Br_2$, $Zr(OC_2H_5)_2Cl_2$, $Zr(OC_4H_9)_2Cl_2$, and $Zr(OC_6H_{13})_2Br_2$; zirconium trialkoxyhalides such as $Zr(OCH_3)_3Cl$, $Zr(OC_2H_5)_3Br$, $Zr(OC_4H_9)_3Cl$, and $Zr(OC_6H_{13})_3Br$; and zirconium tetraalkoxides such as $Zr(OCH_3)_4$, $Zr(OC_2H_5)_4$, $Zr(OC_3H_7)_4$, and $Zr(OC_6H_{13})_4$. Certain of the alkoxides and alkoxyhalides, such as zirconium tetrabutoxide, are commonly obtained in the form of 1:1 complexes with an alcohol corresponding to the alkoxy radicals contained therein, and for purposes hereof, the terms "alkoxide" and "alkoxyhalide" and the formula $Zr(OR)_mX_{4-m}$ are intended to include such compounds. Mixtures of zirconium compounds also can be employed. Preferred zirconium compounds are the tetraalkoxides, and particularly, zirconium tetrabutoxide.

Useful alkylaluminum components include compounds represented by the formula $AlR'_qX_{3-q}$, wherein R' is an alkyl radical of 1 to about 10 carbon atoms, preferably from 1 to about 6 carbon atoms, q runs from 1 to 3, and X is as described above. Such compounds include trialkylaluminums such as triethyl-, triisobutyl-, and trihexylaluminum, dialkylaluminum halides such as diethyl-, diisobutyl- or dihexylaluminum chloride or bromide, and alkylaluminum dihalides such as ethyl-, isobutyl- or hexylaluminum dichloride or dibromide. Mixtures, such as alkylaluminum sesquihalides, also can be employed. As described in greater detail below, the choice of oranogaluminum compound is dependent upon the titanium and zirconium compounds employed in that the former must supply a sufficient amount of halides to form an active catalyst component. However, irrespective of the choice of titanium and zirconium compounds, the preferred alkylaluminum compounds are the alkylaluminum dihalides wherein the alkyl radical contains 1 to 6 carbon atoms, with ethylaluminum dichloride being most preferred.

The solid component, (B), of the catalysts of this invention is prepared by reacting an alkylaluminum component with at least one titanium(IV) compound and at least one zirconium(IV) compound under conditions such that a solid catalyst component is obtained.

In the preparation, the titanium and zirconium components are employed in amounts such that the atomic ratio of titanium to zirconium ranges from about 0.01:1 to about 100:1. The alkylaluminum component is employed in an amount such that the atomic ratio of aluminum to titanium plus zirconium ranges from about 1:1 to about 40:1, and within this range, in at least an amount which is effective to halide the titanium and zirconium employed. The amount which is effective to halide the titanium and zirconium varies depending on the halogen content of alkylaluminum component as well as that of the titanium and zirconium components employed, and is such that total halogen in the system is at least equal to four times the amount of titanium and zirconium contained in the titanium and zirconium components. Preferably, an excess of the alkylaluminum component is employed. More preferably, the excess is such that, within the aforesaid range, total halogen in the system equals about 5 to about 30 times the sum of titanium and zirconium. Most preferably, total halogen ranges from about 10 to about 20 times the sum of titanium and zirconium.

For a given amount of alkylaluminum component, variations in the titanium to zirconium ratio can have a substantial effect on activity and polyalpha-olefin molecular weight distributions. As noted above, the titanium to zirconium atomic ratio broadly ranges from 0.01:1 to about 100:1. In the upper portion of this range, activity is maximized and polyalpha-olefins having relatively broad molecular weight distributions can be obtained. In the lower portion of the range, activities fall off to some extent but with a considerable broadening of molecular weight distribution. Preferably, titanium to zirconium ratios of about 0.1:1 to about 10:1 are employed to achieve a suitable balance of activity and breadth of molecular weight distributions. By varying the titanium to zirconium ratio within this range, it is possible to tailor polyalpha-olefin molecular weight distributions to specific end uses while ensuring sufficiently high activities to eliminate the need for separation of catalyst residues from the polymeric products.

The sequence in which the above-described components are combined and reacted is not critical so long as the titanium component is not combined with the alkylaluminum component in the absence of the zirconium component. In other words, the zirconium component should be present during contacting of the titanium and alkylaluminum components. Usefully, the components are combined concurrently or the zirconium component is combined with the titanium or alkylaluminum component and then the remaining component is added. Preferably, a mixture of the titanium and zirconium components is formed and then combined with the alkylaluminum component.

The preparation according to this invention is carried out at a temperature and for a time sufficient to form a solid catalyst component. Suitable temperatures range from about −20° to about 140° C., with about 0° to about 65° C. being preferred. Reaction times generally range from several minutes to several hours, and preferably from about ½ to about 20 hours. More preferably, the preparation is carried out over about 2 to about 15 hours.

The preparation according to this invention can be carried out neat or in the presence of a hydrocarbon diluent. Preferably, the alkylaluminum component is employed in the form of a solution in a diluent to make the component non-pyrophoric. Preparative steps not involving the alkylaluminum component also are preferably carried out in the presence of a diluent for the sake of convenience and to facilitate handling of the final catalyst component.

Useful diluents are materials in which at least one of the components employed is soluble and which are liquid at reaction temperatures. Preferred diluents are the alkanes, such as hexane, heptane, octane, nonane, and decane, although a variety of other materials including cycloalkanes such as cyclohexane, aromatics such as ethylbenzene, and halogenated and hydrogenated aromatics such as o-dichlorobenzene, tetrahydronaphthalene, and decahydronaphthalene also can be employed.

Preparation of catalyst components according to this invention is conducted in the substantial absence of oxygen, water, carbon dioxide, and other extraneous catalyst poisons. Conveniently, such materials can be excluded by carrying out the preparation under an atmosphere of nitrogen, argon, or other inert gas. Purification of any diluent to be employed in the preparation, such as by percolation through silica gel and/or molecular sieves, also is desirable in this regard.

As a result of the above-described preparation there is obtained a catalyst component in the form of a finely divided solid suspended in a hydrocarbon diluent when a diluent is employed, or in the form of a solid mass when the preparation is carried out neat. In the latter case, the solid can be subdivided into particles of the size desired and suspended in a diluent prior to use if desired. Conversely, in the former case, the solid can be separated from the diluent and dried or resuspended in a diluent if desired.

Prior to use in the polymerization of alphaolefins, the invented catalyst components are combined with a second catalyst component which is an organometallic promoter. Useful organometallic promoters include any of the materials commonly employed as promoters for alpha-olefin polymerization catalyst components containing compounds of the Group IVB, VB, or VIB metals. Examples of such promoters include the Group IA, IIA, IIB, IIIA and IVA metal alkyls, hydrides, alkylhydrides and alkylhalides having 1 to about 20 carbon atoms per alkyl radical, such as alkyllithium compounds, dialkylzinc compounds, trialkylboron compounds trialkylaluminum componds, and alkylaluminum halides and hydrides. Mixtures also can be employed. Specific examples of useful promoters include n-butyllithium, diethylzinc, di-n-propylzinc, triethylboron, triethylaluminum, triisobutylaluminum, tri-n-hexylaluminum, ethylaluminum dichloride, dibromide, and dihydride, isobutylaluminum dichloride, dibromide, and dihydride, diethylaluminum chloride, bromide, and hydride, di-n-propylaluminum chloride, bromide, and hydride, and diisobutylaluminum chloride, bromide, nd hydride. Organometallic promoters which are preferred for use according to this invention are the Group IIIA metal alkyls and dialkylhydrides having 1 to about 20 carbon atoms per alkyl radical. More preferably, the promoter is a trialkylaluminum compound hving 1 to about 6 carbon atoms per alkyl radical. Most preferably, the organometallic promoter is triethylaluminum or triisobutylaluminum.

The organometallic promoter is employed in at least an amount which is effective to promote the activity of the solid component. Preferably, at least about 1.5 parts, by weight, of promoter are employed per part, by weight, of solid catalyst component, although higher ratios, such as 10:1, 25:1, 100:1, or higher also are suitable and often give highly beneficial results. In solution polymerization processes, wherein an inert liquid hydrocarbon polymerization medium is employed, a portion of the promoter can be used to pretreat the polymerization medium if desired.

Also prior to use of the invented catalyst components in the polymerization of alpha-olefins, and prior to combining the components with an organometallic promoter, it is contemplated to temporarily and reversibly deactivate the components by contacting the same with a suitable deactivating agent. In this manner, the catalyst components, which exhibit some polymerization activity even in the absence of a promoter, can be employed, without plugging of catalyst feed lines or inlet ports, in polymerization systems wherein a flush stream containing polymerizable monomer is used to convey the component to a polymerization zone or the component otherwise contacts polymerizable monomer prior to entry into the polymerization zone. Once inside the polymerization zone, the effects of the temporary and reversible deactivation can be undone and activity promoted by contacting the components with an organometallic promoter.

Suitable deactivating agents, methods for using the same, and a method for introducing temporarily and reversibly deactivated catalyst components into a polymerization zone are disclosed in copending application Ser. No. 854,831, filed Nov. 25, 1977, in the name of Glen R. Hoff et al., now U.S. Pat. No. 4,130,699, which is incorporated herein by reference. The deactivating agent which is preferred for use with the catalyst components of this invention is hydrogen chloride.

The catalysts of this invention are employed in processes for the polymerization of alpha-olefins wherein at least one alpha-olefin is contacted with the catalyst under polymerizing conditions. Solution, bulk, and vapor phase processes are contemplated herein.

Alpha-olefins which can be polymerized in the presence of the invented catalysts include ethylene, propylene, butene-1, pentene-1, 4-methylpentene-1, hexene-1 and so forth, as well as mixtures thereof. Preferably, the invented catalysts are employed in the polymerization of ethylene or a mixture of ethylene with up to about 20 mole % of a higher alpha-olefin. Most preferably, the catalysts of this invention are employed in the homopolymerization of ethylene.

The conditions under which the invented catalysts are employed in the polymerization of alpha-olefins are referred to herein as "polymerizing conditions" and include polymerization temperature and time, monomer pressure, the use of polymerization media in solution processes, exclusion of catalyst poisons, the use of agents to regulate polymer molecular weights, and other conditions well known to persons of skill in the art. The following description of polymerizing conditions is intended to furnish guidance as to the use of the invented catalyst and is not to be construed as limiting the scope of the invention.

Polymerization temperatures will vary depending upon the type of process employed. In solution processes, wherein a solution of molten polyalpha-olefin in an inert polymerization medium is formed, the temperature should be sufficiently high to avoid solidification of the polymer but not so high as to vaporize the diluent employed. In the solution polymerization of ethylene, suitable temperatures range from about 110° to about 210° C. In particle form polymerization processes, wherein a suspension of solid, particulate polymer in an inert polymerization medium is formed, and in vapor phase processes, wherein solid, particulate polymer is formed in the absence of liquid polymerization medium, temperatures should be maintained at levels sufficiently low to avoid melting of the polymer in the polmerization zone but high enough to achieve reasonable polymerization rates. Preferred temperatures in the particle form polymerization of ethylene range from about 40° to about 110° C. In the vapor phase polymerization of ethylene, temperatures preferably range from about 40° to about 130° C., and more preferably, from about 60° to about 120° C.

In solution or particle form processes, the liquid employed as the polymerization medium can be an alkane or cycloalkane such as butane, isobutane, pentane, hexane, heptane or cyclohexane, or a hydrogenated aromatic compound such as tetrahydronaphthalene or decahydronaphthalene, or a high molecular weight liquid paraffin or mixture of paraffins which are liquid at the polymerization temperature, or an aromatic hydrocarbon such as toluene or xylene or a halogenated aromatic compound such as chlorobenzene, chloronaphthalene or o-dichlorobenzene. The nature of the medium is subject to considerable variation, although the medium employed should be liquid under polymerization conditions and relatively inert. Other media which can be used include ethylbenzene, isopropylbenzene, ethyltoluene, n-propylbenzene, diethylbenzenes, mono- and dialkylnaphthalenes, n-octane, isooctane, and methylcyclohexane. Preferably, a butane, pentane, or hexane is employed.

Irrespective of the type of polymerization process employed, polymerization typically is carried out in the presence of agents which act as chain terminators and thereby allow for control of polyalpha-olefin molecular weights. Most commonly, hydrogen is employed for this purpose. The amount of hydrogen to be employed will vary depending upon the molecular weight desired and can be determined by those of skill in the art based upon the examples appearing herein.

Also irrespective of polymerization technique, monomer pressures and total reactor pressures are maintained at levels sufficiently high to achieve reasonable polymerization rates and generally range from about 100 to about 1000 psig, and more preferably, from about 200 to about 400 psig.

Polymerization time generally ranges from several minutes to several hours in batch processes. Contact times ranging from about 1 to about 4 hours are common when autoclave type reactors are employed. In continuous systems, wherein polymerization medium, if any, and excess monomer are recycled to a charging zone and additional catalyst and monomer introduced, contact times in the polymerization zone can be regulated as desired and generally range from about ½ to several hours.

Polymerization in the presence of the invented catalysts is carried out in the substantial absence of oxygen, water, carbon dioxide, and other materials capable of adversely affecting catalyst activity. Typically, special steps need not be taken to exclude such materials from the polymerization zone due to the positive pressure exerted by the alpha-olefin to be polymerized. Purification of monomer and any diluent to be employed, such as by percolation through molecular sieves and/or silica gel, or through the use of excess promoter to scavenge impurities also is helpful in excluding catalyst poisons. In polymerization processes wherein the invented catalyst components are contacted with a deactivating agent to facilitate addition of the component to the polymerization zone in an alpha-olefin-containing flush stream, the use of excess promoter to scavenge the deactivator often is desirable to ensure the attainment of high activities.

As a result of the above-described polymerization in the presence of the invented catalysts there are obtained polyalpha-olefins having molecular weights typically ranging from about 50,000 to about 3,000,000 in sufficiently high yields, relative to the amount of catalyst employed, that useful polymeric products are obtained without separation of catalyst residues. The polymers exhibit broad molecular weight distributions and are processable by a variety of techniques such as extrusion, mechanical melting, casting, and molding.

The following examples illustrate the present invention and are not to be construed as limiting the scope thereof.

EXAMPLE 1

Into a 300 ml. round bottom flask equipped with magnetic stirrer and nitrogen inlet were added 8.5 ml. titanium tetrabutoxide, 5.5 ml. zirconium tetrabutoxide $(Zr(OC_4H_9)_4 \cdot C_4H_9OH)$ and 15 ml. hexane, and the mixture was stirred for about 5 minutes at room temperature. The flask then was immersed in a room temperature water bath and 108 ml. of 50 wt.% ethylaluminum dichloride (EADC) in hexane were added over 40 minutes. The contents of the flask were stirred during this time and stirring was continued for an additional 2 hours after completion of the EADC addition. There resulted a finely divided solid suspended in hexane. A 5 ml. sample of this suspension was removed, diluted with 45 ml. hexane, and samples were employed in the polymerization of ethylene according to EXAMPLE 5. The atomic ratio of titanium to zirconium to aluminum employed in preparation of this catalyst component was 1:0.5:15. The ratio of halogen in the system to titanium plus zirconium was 20:1.

EXAMPLE 2

A catalyst component was prepared as in EXAMPLE 1 except that the flask was immersed in a room temperature water bath after addition of titanium tetrabutoxide and hexane, and after about 10 minutes, the zirconium tetrabutoxide was added. The EADC addition was completed in 2¼ hours and stirring was continued for an additional 1½ hours. Samples of the resulting suspension, diluted as in EXAMPLE 1, were employed according to EXAMPLE 5.

EXAMPLE 3

A catalyst component was prepared as in EXAMPLE 1 except that 22 ml. zirconium tetrabutoxide and 145 ml. EADC solution were employed, the latter were added over about 1⅜ hours, and stirring was continued over an additional 1¼ hours. A 4 ml. sample of the resulting suspension was removed, diluted with 60 ml. hexane, and aliquots were employed according to EXAMPLE 5. The atomic ratio of titanium to zirconium to aluminum used in preparation was 1:2:20. The ratio of halogen to titanium plus zirconium was 13.3:1.

EXAMPLE 4

Into a flask equipped as in EXAMPLE 1 were added 3.4 ml. titanium tetrabutoxide, 4.4 ml. zirconium tetrabutoxide, and 25 ml. hexane, and the mixture was stirred for about 15 minutes at room temperature. The flask then was placed in a room temperature water bath and 29 ml. EADC solution were added over about 2 hours. The contents of the flask were stirred during this time and stirring was continued for an additional hour. A 6 ml. sample of the resulting catalyst suspension was removed, diluted with 45 ml. hexane, and aliquots of the result, identified as 4A were employed according to EXAMPLE 5. The titanium to zirconium to aluminum atomic ratio was 1:1:10 and the ratio of halogen to titanium plus zirconium was 10:1.

To the catalyst suspension remaining after removal of the 6 ml. sample were added 26 ml. of EADC solution over about ½ hour with stirring. An 8 ml. sample of the resulting suspension was removed, diluted with 45 ml. hexane, and aliquots thereof, identified as 4B, were employed according to EXAMPLE 5. The titanium to zirconium to aluminum atomic ratio was 1:1:20 and the halogen to titanium plus zirconium ratio was 20:1.

EXAMPLE 5

Samples of the catalyst suspensions prepared in EXAMPLES 1–4 and an amount of the promoter specified in TABLE 1 were stirred in 261 ml. hexane in a 500 ml. stainless steel autoclave reactor. Unless otherwise indicated, the amount of promoter used was 60 mg. in triethylaluminum (TEA) promoted runs and 99 mg. in triisobutylaluminum (TIBA) promoted runs. Hydrogen, under pressures specified in TABLE 1, and sufficient ethylene to maintain a total reactor pressure of 300 psig were charged to the reactor and ethylene was polymerized for 1 hour at 180° F. The reactor then was vented and opened to terminate the polymerization. The contents of the reactor were discharged and the solid polyethylene was filtered and dried. The amount of catalyst suspension employed, the promoter used, hydrogen pressure, yield, activity (ACT), melt index (MI) determined according to ASTM D 1238 65T Condition E, and the ratio ($MF_{10}/MF_1$) of melt index determined according to ASTM D 1238 65T Condition F to MI, which is an indication of molecular weight distribution, are reported in TABLE 1.

TABLE 1

| CATALYST | AMOUNT (ml.) | PROMOTER | $H_2$ (psi) | YIELD (g.) | ACT[1] | MI[2] | $MF_{10}/MF_1$ |
|---|---|---|---|---|---|---|---|
| 1 | 1.0 | TEA | 100 | 23.3 | 14.0 | 0.05 | ND[3] |
|   | 1.0 | TEA | 120 | 20.7 | 12.4 | 0.05 | ND |
|   | 1.6 | TEA | 140 | 40.0 | 16.2 | 0.36 | 87 |
|   | 1.4 | TEA | 150 | 36.0 | 15.4 | 0.59 | 76 |
|   | 2.0 | TEA | 160 | 44.2 | 13.2 | 4.5 | 55 |
|   | 2.0 | TEA | 200 | 26.3 | 7.8 | 24 | ND |
|   | 0.7*** | TIBA | 120 | 12.0 | 10.3 | 0.14 | ND |
|   | 1.0 | TIBA | 140 | 40.7 | 24.3 | 1.3 | 67 |
|   | 1.0 | TIBA | 150 | 36.6 | 21.9 | 1.8 | 60 |
| 2 | 1.0 | TEA* | 140 | 21.7 | 13.0 | 0.53 | 70 |
|   | 1.0 | TIBA | 100 | 50.1 | 29.7 | 0.41 | 73 |
|   | 1.0 | TIBA | 140 | 34.3 | 20.5 | 1.4 | 61 |
| 3 | 2.0 | TEA | 180 | 22.6 | 6.0 | 0.04 | ND |
|   | 2.0 | TEA | 200 | 14.7 | 3.8 | 0.05 | ND |
|   | 2.0 | TIBA | 200 | 19.5 | 5.0 | 0.37 | 62 |
| 4A | 1.0 | TEA** | 120 | 17.1 | 6.3 | 0.09 | ND |
| 4B | 1.0 | TEA** | 120 | 55.4 | 20.3 | 0.09 | ND |
|   | 1.0 | TEA** | 160 | 33.3 | 12.4 | 0.28 | 83 |
|   | 1.0 | TEA** | 180 | 26.4 | 9.9 | 0.29 | 86 |
|   | 1.0*** | TEA** | 200 | 13.0 | 4.8 | 0.18 | 94 |

[1]ACT (activity) is expressed in kg. polymer/g. titanium + zirconium/hour.
[2]MI is expressed in dg./min.
[3]ND in the table stands for not determined.
*The amount of TEA used in this run was 40 mg.
**The amount of TEA used in these runs was 120 mg.
***These runs are anomalous and do not represent true catalyst behavior.

EXAMPLES 1–5 and TABLE 1 illustrate the preparation, use, and polymerization performance of the invented catalysts. From the table, it can be seen that the catalysts exhibited good activities, and polymer molecular weight distributions were broad as indicated by $MF_{10}/MF_1$ ratios. Additionally, the catalysts exhibited a relatively high sensitivity to hydrogen as indicated by the increases in MI with increases in hydrogen pressure. $MF_{10}/MF_1$ was not determined for runs in which the polyethylene obtained had a low melt index because crosslinking of polymer in the testing apparatus coupled with high melt viscosities leads to difficulties with the apparatus.

EXAMPLE 6

Into a 300 ml. round bottom flask equipped as in EXAMPLE 1 were added 2.8 g. zirconium tetrachloride and 15 ml. hexane. Stirring of the mixture was begun and 2.8 ml. titanium tetrachloride were added. Stirring was continued for about 7 minutes and the flask was then placed in an ice bath. About 5 minutes later, with continued stirring, dropwise addition of 25 wt.% triethylaluminum (TEA) in hexane was begun. A total of 25 ml. were added over 2½ hours and stirring was continued for an additional 2½ hours. A 2 ml. sample of the resulting suspension was removed and diluted with 60 ml. hexane, and aliquots of the result were employed in the polymerization of ethylene according to the procedure of EXAMPLE 5. Results are reported in TABLE 2. The titanium to zirconium to aluminum atomic ratio for the catalyst was 1:0.5:1.5 and the halogen to titanium plus zirconium ratio was 4:1.

TABLE 2

| RUN | PROMOTER* | $H_2$ (psi) | ACT[1] | MI[2] | $MF_{10}/MF_1$ |
|---|---|---|---|---|---|
| 1 | TIBA | 120 | 24.3 | 0.27 | 71 |
| 2 | TIBA | 120 | 27.0 | 0.33 | 56 |
| 3 | TIBA | 140 | 18.9 | 0.29 | 61 |
| 4 | TIBA | 140 | 18.6 | 0.36 | 59 |

[1]-[2]See TABLE 1.
*99 mg. in all runs.

EXAMPLE 6 and TABLE 2 illustrate a catalyst component preparation wherein the halogen content of the titanium and zirconium components employed is sufficiently high that the metals are effectively halided without the use of a halogen-containing alkylaluminum component. Similar to the catalyst components of EXAMPLES 1-4, the activity in this example was good and polymer molecular weight distributions were broad.

EXAMPLE 7

In this example a series of catalyst components, A-F, were prepared, according to the general procedure of EXAMPLES 1-4 and 6, using titanium tetrabutoxide, zirconium tetrabutoxide, and ethylaluminum dichloride in amounts sufficient to give the atomic ratios reported in TABLE 3. Ethylene was polymerized in the presence of these catalyst components and 99 mg. of TIBA according to the procedure of EXAMPLE 5. Results are reported in TABLE 3.

TABLE 3

| CATALYST | Ti:Zr:Al | $H_2$ (psi) | ACT[1] | MI[2] | $MF_{10}/MF_1$ |
|---|---|---|---|---|---|
| A | 1:0.01:10 | 100 | 57.4 | 0.41 | 49 |
|   |           | 100 | 47.8 | 0.59 | 48 |
|   |           | 100 | 35.1 | 0.70 | 47 |
|   |           | 100 | 47.8 | 1.1  | 43 |
|   |           | 120 | 38.3 | 1.1  | 48 |
|   |           | 120 | 31.3 | 1.4  | 44 |
| B | 1:0.1:10  | 80  | 51.7 | 0.38 | 52 |
|   |           | 80  | 48.7 | 0.27 | 51 |
|   |           | 90  | 42.6 | 0.38 | 50 |
|   |           | 100 | 45.7 | 1.5  | 45 |
|   |           | 120 | 30.4 | 1.9  | 49 |
| C | 1:0.5:15  | 100 | 27.0 | 0.48 | 57 |
|   |           | 120 | 26.5 | 0.66 | 63 |
|   |           | 160 | 16.2 | 1.6  | 60 |
| D | 1:1:20    | 140 | 11.8 | 0.20 | 86 |
|   |           | 160 | 11.2 | 0.21 | 88 |
|   |           | 180 | 7.8  | 0.39 | 88 |
| E | 0:1:10    | 100 | 0.28 | *    | *  |
| F | 1:0:10    | 100 | 48.1 | 0.16 | 51 |
|   |           | 100 | 32.1 | 0.54 | 47 |
|   |           | 100 | 38.5 | 1.9  | 44 |
|   |           | 100 | 35.3 | 0.56 | 47 |
|   |           | 120 | 26.0 | 1.6  | 41 |
|   |           | 120 | 28.2 | 1.0  | 49 |

[1]-[2]See TABLE 1.
*Yield was too low to determine MI and $MF_{10}/MF_1$.

EXAMPLE 7 and TABLE 3 illustrate the effects on catalyst performance of varying titanium to zirconium levels at an essentially constant titanium plus zirconium to aluminum atomic ratio. It can be seen that increasing amounts of zirconium led to broadening of molecular weight distributions as indicated by increases in $MF_{10}/MF_1$ ratios. Also, as zirconium levels increased, activity decreased. Comparison of catalyst components A-D to components E and F, which were prepared using only one of the zirconium or titanium components for comparative purposes, illustrates that the use of a combination of titanium and zirconium components according to this invention gave catalyst components which were superior in terms of activity and ability to produce polymers having broad molecular weight distributions.

EXAMPLE 8

This example illustrates preparation of temporarily and reversibly deactivated catalyst components and the effects of deactivation treatment on polymerization performance.

Catalyst suspensions A-C were prepared according to the general procedure of EXAMPLES 1-4 and 6 from titanium tetrabutoxide, zirconium tetrabutoxide, and 50 wt.% EADC in hexane in amounts sufficient to give the following titanium to zirconium to aluminum atomic ratios: 1:0.5:7.5 (component A); 1:1:15 (component B); and 1:0.5:10 (component C). Portions of each suspension were removed and diluted with hexane and the remainder of each suspension then was treated with gaseous hydrogen chloride according to the following procedure. A portion of the supernatent of each suspension corresponding to a percentage of the total volume of the suspension was removed and then an amount of hexane was added to the remaining suspension. The result then was stirred and an amount of gaseous hydrogen chloride passed therethrough at ambient temperature over a period of about 1 to 2 hours. Samples of each suspension then were removed and diluted with hexane. The amount and volume % of supernatent removed from each suspension, amount of hexane added, weight of hydrogen chloride used, weight of hydrogen chloride taken up by the catalyst suspension, and molar ratio of hydrogen chloride taken up to metal-alkyl bonds in the catalyst suspension are reported in TABLE 4.

TABLE 4

| CATALYST SUSPENSION | A | B | C |
|---|---|---|---|
| SUPERNATENT REMOVED (ml.) | 166 | 362 | 277 |
| (vol.%) | 49.6 | 62.1 | 67.7 |
| HEXANE ADDED (ml.) | 250 | 362 | 277 |
| HCl USED (g.) | 40 | 60 | 30 |
| HCl TAKEN UP (g.) | 13.8 | 22.8 | 12.1 |
| HCl TAKEN UP/METAL-ALKYL | 1.01 | 1.11 | 1.03 |

Aliquots of the samples removed from each suspension prior to hydrogen chloride treatment, identified as A(1), B(1), and C(1) respectively, and aliquots of the diluted, hydrogen chloride treated samples, identified as A(2), B(2) and C(2) respectively were employed in the polymerization of ethylene according to the procedure of EXAMPLE 5. In each run, 99 mg. TIBA were used as the promoter. Results are reported in TABLE 5.

TABLE 5

| CATALYST | $H_2$ (psi) | ACT[1] | MI[2] | $MF_{10}/MF_1$ |
|---|---|---|---|---|
| A(1) | 110 | 21.3 | 0.67 | 50 |
|      | 120 | 23.8 | 0.88 | 51 |
|      | 140 | 19.4 | 1.1  | 56 |
|      | 160 | 14.6 | 1.4  | 57 |
| A(2) | 90  | 25.6 | 0.50 | 54 |
|      | 100 | 24.8 | 0.47 | 56 |
|      | 120 | 21.6 | 1.1  | 53 |
|      | 160 | 17.0 | 2.2  | 63 |
| B(1) | 160 | 10.8 | 0.29 | 77 |

TABLE 5-continued

| CATALYST | H₂ (psi) | ACT⁽¹⁾ | MI⁽²⁾ | MF₁₀/MF₁ |
|---|---|---|---|---|
| | 180 | 7.5 | 0.90 | 80 |
| | 200 | 6.5 | 1.3 | 78 |
| B(2) | 180 | 7.5 | 0.21 | 78 |
| | 200 | 5.2 | 0.58 | 74 |
| C(1) | 130 | 12.7 | 0.55 | 57 |
| | 140 | 15.9 | 0.53 | 72 |
| | 160 | 11.9 | 1.4 | 64 |
| C(2) | 160 | 10.0 | 0.37 | 77 |
| | 180 | 8.4 | 0.77 | 77 |
| | 190 | 7.6 | 1.0 | 77 |

⁽¹⁾⁻⁽²⁾See TABLE 1.

Comparison of the performance of catalyst components before and after treatment with hydrogen chloride is difficult due to the limited number of runs at equal hydrogen pressures. In general, however, it can be seen that the hydrogen chloride treatment did not substantially alter catalyst performance.

We claim:

1. A catalyst for the polymerization of alpha-olefins consisting essentially of (A) an organometallic promoter and (B) a solid component which is the reaction product of an alkylaluminum dihalide; at least one titanium(IV) compound selected from the group consisting of halides, alkoxides, and alkoxyhalides; and at least one zirconium(IV) alkoxide; wherein the atomic ratio of titanium to zirconium ranges from about 0.01:1 to about 100:1, the alkylaluminum dihalide is employed in an amount such that the atomic ratio of aluminum to titanium plus zirconium ranges from about 1:1 to about 40:1 and the atomic ratio of total halogen in the system to the sum of elemental titanium and zirconium is at least 4:1; said reaction being carried out at about −20° to about 140° C. and including a first step wherein at least said zirconium alkoxide is present.

2. The catalyst of claim 1 wherein the at least one titanium(IV) compound comprises a compound of the formula Ti(OR)$_m$X$_{4-m}$ wherein R is a hydrocarbyl radical of 1 to about 20 carbon atoms, X is chlorine or bromine, and m ranges from 0 to 4; the at least one zirconium(IV) alkoxide contains from 1 to about 6 carbon atoms per alkoxy group; and the alkylaluminum dihalide contains 1 to about 10 carbon atoms.

3. The catalyst of claim 2 wherein the organometallic promoter is a Group IIIA metal alkyl or dialkylhydride having 1 to about 20 carbon atoms per alkyl radical.

4. The catalyst of claim 3 wherein the at least one titanium compound comprises titanium tetrachloride, tetraalkoxide, or alkoxychloride having 1 to about 6 carbon atoms per alkoxy radical.

5. The catalyst of claim 4 wherein the atomic ratio of titanium to zirconium ranges from about 0.1:1 to about 10:1.

6. The catalyst of claim 5 wherein the organometallic promoter is a trialklaluminum having 1 to about 6 carbon atoms per alkyl radical.

7. The catalyst of claim 6 wherein the alkylaluminum dihalide is an alkylaluminum dichloride wherein the alkyl radical contains 1 to about 6 carbon atoms.

8. The catalyst of claim 7 wherein the titanium compound is titanium tetrabutoxide, the zirconium tetraalkoxide is zirconium tetrabutoxide, and the alkylaluminum dichloride is ethylaluminum dichloride.

9. The catalyst of claim 8 wherein the promoter is triethylaluminum.

10. The catalyst of claim 8 wherein the promoter is triisobutylaluminum.

11. The catalyst of claim 1 wherein the solid component (B) is treated with an agent capable of temporarily and reversibly deactivating said component.

12. The catalyst of claim 11 wherein the agent is hydrogen chloride.

13. The catalyst of claim 1 wherein the components in (B) are reacted concurrently.

14. The catalyst of claim 1 wherein said alkylaluminum dihalide component is reacted with a mixture of said zirconium(IV) alkoxide and said titanium(IV) compound.

15. The catalyst of claim 1 wherein said titanium(IV) compound is reacted with a mixture of said zirconium(IV) alkoxide and alkylaluminum dihalide component.

16. A method for preparing an olefin polymerization catalyst component comprising reacting components consisting essentially of:
  (1) at least one zirconium(IV) alkoxide;
  (2) at least one titanium(IV) compound selected from the group consisting of halides, alkoxides, and alkoxyhalides in an amount such that the atomic ratio of titanium in (2) to zirconium in (1) ranges from about 0.01:1 to about 100:1; and
  (3) at least one alkylaluminum dihalide component in an amount such that the atomic ratio of aluminum to the sum of zirconium in (1) plus titanium in (2) ranges from about 1:1 to about 40:1 and the amount of halogen contained in components (1), (2), and (3) is at least four times the sum of zirconium in (1) and titanium in (2);

said reaction being carried out at a temperature of about −20° to about 140° C. and including a first step wherein at least component (1) is present.

17. The method of claim 16 wherein (1) is a zirconium(IV) alkoxide containing 1 to about 6 carbon atoms per alkoxy group, (2) is a titanium(IV) alkoxide containing 1 to about 6 carbon atoms per alkoxy group, and (3) is an alkylaluminum dihalide containing 1 to about 10 carbon atoms per alkyl group.

18. The method of claim 17 wherein (1) is zirconium tetrabutoxide, (2) is titanium tetrabutoxide, and (3) is ethylaluminum dichloride.

19. The method of claim 18 wherein the atomic ratio of titanium in (2) to zirconium in (1) ranges from about 0.1:1 to about 10:1.

20. The method of claim 19 wherein components (1), (2), and (3) are reacted concurrently.

21. The method of claim 19 wherein component (3) is reacted with a mixture of components (1) and (2).

22. The method of claim 19 wherein component (2) is reacted with a mixture of components (1) and (3).

23. The method of claim 16 further characterized in that said catalyst component is contacted with an agent capable of temporarily and reversibly deactivating said component.

24. The method of claim 23 wherein said agent is hydrogen chloride.

25. The method of claim 23 further characterized in that said catalyst component is combined with an organometallic promoter.

26. The method of claim 25 wherein said organometallic promoter is triethylaluminum or triisobutylaluminum.

27. The method of claim 16 further characterized in that said catalyst component is combined with an organometallic promoter.

28. The method of claim 27 wherein said organometallic promoter is triethylaluminum or triisobutylaluminum.

* * * * *

UNITED STATES PATENT OFFICE
CERTIFICATE OF CORRECTION

Patent No. 4,210,559            Dated July 1, 1980

Inventor(s) John L. Melquist, Nicholas K. Kildahl, and Peter Fotis

It is certified that error appears in the above-identified patent and that said Letters Patent are hereby corrected as shown below:

| Patent Column | Line | |
|---|---|---|
| 4 | 10 | "1 to 6" should be --1 to about 6-- |
| 5 | 28 | "o-dichlorobenzene" should be --o-dichlorobenzene-- |
| 5 | 50 | "alphaolefins" should be --alpha-olefins-- |
| 6 | 3-4 | "nd hydride" should be --and hydride-- |
| 6 | 8 | "hving" should be --having-- |
| 7 | 40 | "o-dichlorobenzene" should be --o-dichlorobenzene-- |

Signed and Sealed this

*Second* Day of *December 1980*

[SEAL]

*Attest:*

SIDNEY A. DIAMOND

*Attesting Officer*      *Commissioner of Patents and Trademarks*